J. BALL.
Sheets for Cutting Out Irregular Articles.
No. 6,621. Reissued Aug. 31, 1875.
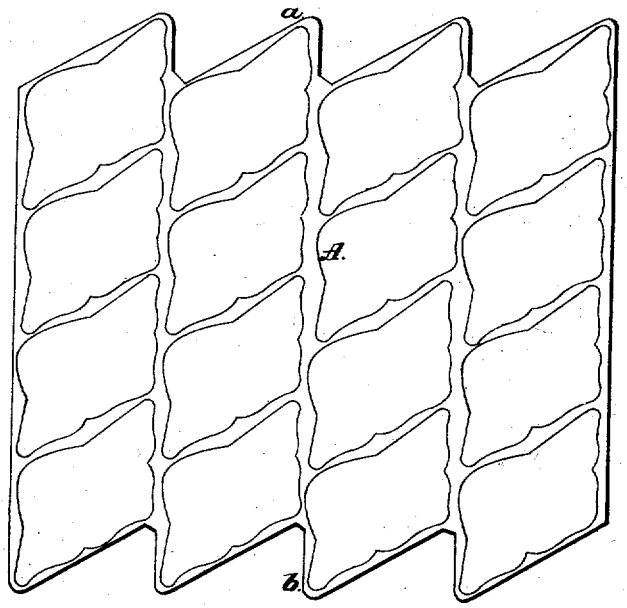
Witnesses:
A. H. Norris
Jos. S. Coombs
Inventor:
James Ball
Per Vanfantwood & Cauff
attys.
N. PETERS, PHOTO-LITHOGRAPHER, WASHINGTON, D. C.

UNITED STATES PATENT OFFICE.

JAMES BALL, OF BROOKLYN, N. Y., ASSIGNOR, BY MESNE ASSIGNMENTS, TO SAMUEL RAYNOR & CO. AND JOHN Q. PREBLE.

IMPROVEMENT IN SHEETS FOR CUTTING OUT IRREGULAR ARTICLES.

Specification forming part of Letters Patent No. 106,451, dated August 16, 1870; reissue No. 6,621, dated August 31, 1875; application filed April 2, 1875.

*To all whom it may concern:*

Be it known that I, JAMES BALL, of Brooklyn, in the county of Kings and State of New York, have invented a certain new and Improved Sheet for Cutting out Irregular Articles, of which the following is a specification:

This invention is illustrated in the accompanying drawing, which represents a plan or face view of a sheet of paper cut out according to this invention.

This invention consists in a sheet for cutting out irregular articles, said sheet being formed at each of its ends with angular recesses across the sheet, the recesses at one end being the reverse from those at the opposite end, so that in cutting from said sheet irregular articles, such as blanks for envelopes, a considerable saving of material is effected.

In cutting out irregular articles, such as blanks for envelopes, the first operation usually is to cut up a roll of paper or other material into sheets, each sheet large enough for sixteen (more or less) blanks. The form of these sheets is either square or diamond shaped; but in all cases known to me the edges of the sheets have been rectilinear, and I have found that by cutting the sheets with recessed or pectinated ends or edges a great saving of paper can be effected. In cutting out envelope-blanks, for instance, if the sheets are cut with square ends, it requires, under the best possible management, thirty inches in length (the width of the sheet being that of the roll from which the sheets are cut) for sixteen envelope-blanks of ordinary letter size, but by cutting the sheets with pectinated or recessed ends, according to my invention, only twenty-seven inches in length are required for sixteen envelopes of the same size, and consequently a very material saving of paper is effected.

In the drawing, the letter A designates a sheet of paper cut out with recessed ends *a b*, the recesses being formed in succession across the sheet, those of the end *a* being the reverse of those of the end *b*, so that no paper is wasted. My invention is here illustrated in connection with rhomb-shaped blanks, and on a sheet of this kind the pattern for the blank can be so adjusted that sixteen of said blanks can be cut out from the same, and I have found that I can save three inches of paper on each sheet of sixteen envelopes, as compared with the old method of cutting, where the sheets A have been cut with straight ends. In cutting according to this old method a quantity of material is lost at each end of each sheet, but by following my method the waste takes place only at one end of the first sheet, and then again at the opposite end of the last sheet from the roll, while the intermediate sheets are cut up almost without any waste.

The amount of material saved by my invention of course varies according to the size and shape of the blanks or articles to be cut out, but my experience shows that in the factory where I am employed, and where we have cut up for successive days as much as forty-five thousand yards of paper per day, I have been enabled to effect a saving of four thousand five hundred yards per day, since forty thousand five hundred yards of paper, when cut according to my invention, will produce as many blanks as forty-five thousand yards cut in the old way.

In order to cut out my sheets with the requisite accuracy and dispatch, I have constructed a cutting-machine by means of which sheets with scalloped edges can be cut with great facility; but I do not restrict myself to any mode of forming such edges or ends of the sheets.

What I claim as new, and desire to secure by Letters Patent, is—

The sheet A, formed with recesses *a b* across the sheet, the recesses at one end being the exact reverse from those at the opposite end, substantially as shown and described.

In testimony that I claim the foregoing I have hereunto set my hand and seal this 23d day of March, 1875.

JAMES BALL. [L. S.]

Witnesses:

W. HAUFF,

E. F. KASTENHUBER.